(12) United States Patent
Carter

(10) Patent No.: US 8,274,920 B2
(45) Date of Patent: Sep. 25, 2012

(54) TOKEN BUS COMMUNICATION SYSTEM

(75) Inventor: Richard H Carter, Aberdeen (GB)

(73) Assignee: Aker Subsea Limited, Maidenhead, Berkshire (GB)

( * ) Notice: Subject to any disclaimer, the term of this patent is extended or adjusted under 35 U.S.C. 154(b) by 477 days.

(21) Appl. No.: 12/593,817

(22) PCT Filed: Feb. 8, 2008

(86) PCT No.: PCT/GB2008/000436
§ 371 (c)(1),
(2), (4) Date: Sep. 29, 2009

(87) PCT Pub. No.: WO2008/119922
PCT Pub. Date: Oct. 9, 2008

(65) Prior Publication Data
US 2010/0135310 A1 Jun. 3, 2010

(30) Foreign Application Priority Data
Mar. 29, 2007 (GB) .................................. 0706054.4

(51) Int. Cl.
*H04L 12/28* (2006.01)

(52) U.S. Cl. ........ 370/257; 370/392; 370/451; 709/220; 709/253

(58) Field of Classification Search .................. None
See application file for complete search history.

(56) References Cited

U.S. PATENT DOCUMENTS

| 4,236,245 | A | | 11/1980 | Freeny et al. |
| 4,949,337 | A | * | 8/1990 | Aggers et al. .................. 370/451 |
| 5,140,586 | A | * | 8/1992 | Kloper et al. .................. 370/216 |
| 5,566,178 | A | | 10/1996 | Butter et al. |
| 2002/0181503 | A1 | | 12/2002 | Montgomery, Jr. |

OTHER PUBLICATIONS

International Search Report for PCT/GB2008/000436 mailed Aug. 25, 2008.
Written Opinion of the International Searching Authority for PCT/GB2008/000436 mailed Aug. 25, 2008.

* cited by examiner

*Primary Examiner* — Brian Roberts
(74) *Attorney, Agent, or Firm* — Nixon & Vanderhye PC

(57) ABSTRACT

In a token bus system a node with the token can transmit on the bus a packet that contains two destination addresses. One address specifies the node that should receive the data component (payload) of the transmitted packet. The other address specifies the node that should receive the token. The network protocol specifies that a node with the token must immediately transmit a packet containing just the token or a packet with token and data if it has data to send. When no data is being passed from one node to another on the network, the token may be passed from one node to the next in order. Each node will pass the token to the next highest node number. If a node has the token has some data for sending it transmits a packet with the token for the next node and data for any of the nodes. The bus system requires every node to receive all packets and process them to determine whether the token or the data (or both) is destined for that node.

12 Claims, 6 Drawing Sheets

Protocol State Machine

General Header

| Byte | Field | Num Byte |
|---|---|---|
| 0 | Synch | 1 |
| 1 | Command | 1 |
| 2 | Source | 1 |
| 3 | Data Destination | 1 |
| 4 | Token Destination | 1 |
| 5 | Protocol | 1 |
| 6&7 | Checksum | 2 |
| 8&9 | Data Length | 2 |
| 10..10+(n-1) | Data | n |

FIG. 3

Payload Protocol Identifiers

| Protocol | Value |
|---|---|
| *None* | 0x00 |
| ARP | 0x01 |
| IP | 0x02 |

FIG. 4

Command Identifiers

| Command | Value |
|---|---|
| Response-Window Request | 0x01 |
| Response-Window Response | 0x02 |
| Sequence Table | 0x03 |
| Token Only | 0x04 |
| Token & Data | 0x05 |

FIG. 5
Response-window Request 50

| Byte | Field | Value |
|---|---|---|
| 0 | Synch | 0x5A |
| 1 | Command | 0x01 |
| 2 | Source | MAC address of sending node (Master) |
| 3 | Data Dest | 0x255 (broadcast) |
| 4 | Token Dest | MAC address of sending node (Master) |
| 5 | Protocol | 0x00 |
| 6&7 | Checksum | As calculated |
| 8 | Min Address | e.g. 1 |
| 9 | Max Addres | e.g. 254 |

FIG. 6
Response-window Response 60

| Byte | Field | Value |
|---|---|---|
| 0 | Synch | 0x5A |
| 1 | Command | 0x01 |
| 2 | Source | MAC address of sending node (Slave) |
| 3 | Data Dest | MAC address of Master |
| 4 | Token Dest | MAC address of Master |
| 5 | Protocol | 0x00 |
| 6&7 | Checksum | As calculated |
| 8 | Source Check1 | MAC address of sending node (Slave) |
| 9 | Source Check2 | MAC address of sending node (Slave) |

FIG. 7
Sequence Table Packet 70

| Byte | Field | Value |
| --- | --- | --- |
| 0 | Synch | 0x5A |
| 1 | Command | 0x01 |
| 2 | Source | MAC address Master |
| 3 | Data Dest | 0x255 (broadcast) |
| 4 | Token Dest | MAC address of Master |
| 5 | Protocol | 0x00 |
| 6&7 | Checksum | As calculated |
| 8&9 | Data Length | 2+n the number of nodes in the Seq. Table |
| 10&11 | Checksum | Checksum of Seq. Table bytes only |
| 12 | Master Node | MAC address of Master |
| 13 | Sec. Master | MAC address of Secondary Master |
| 14 | Slave | MAC address of first slave node |
| 15 | Slave | MAC address of first slave node |
| ... | ... | ... |
| 11+n | Slave | MAC address of last slave node |

FIG. 8
Token Only Packet

| Byte | Field | Value |
| --- | --- | --- |
| 0 | Synch | 0x5A |
| 1 | Command | 0x04 |
| 2 | Source | MAC address of sending node |
| 3 | Data Dest | 0x00 |
| 4 | Token Dest | MAC address of node to take token |
| 5 | Protocol | 0x00 |
| 6&7 | Checksum | As calculated |
| 8&9 | Data Length | 0x00 |

FIG. 9
Token & Data Packet

| Byte | Field | Value |
| --- | --- | --- |
| 0 | Synch | 0x5A |
| 1 | Command | 0x05 |
| 2 | Source | MAC address of sending node |
| 3 | Data Dest | MAC address of node to take token |
| 4 | Token Dest | MAC address of node to take token |
| 5 | Protocol | 0x00 |
| 6&7 | Checksum | As calculated |
| 8&9 | Data Length | n |
| 10 | Data [0] | |
| 11 | Data [1] | |
| 9+n | Data [n] | | ic # TOKEN BUS COMMUNICATION SYSTEM

This application is the U.S. national phase of International Application No. PCT/GB2008/000436, filed 8 Feb. 2008, which designated the U.S. and claims priority to GB Application No. 0706054.4, filed 29 Mar. 2007, the entire contents of each of which are hereby incorporated by reference.

FIELD OF THE INVENTION

This invention relates to communication systems and particularly to a token bus system primarily intended to provide communication between subsea locations.

BACKGROUND OF THE INVENTION

In a token bus communication system, a logical token is used as arbitrator to avoid conflict between entities (called herein 'nodes') that contend for access to the bus. A node which has possession of the token is free to send a data packet to another node by specifying the destination node's address in a transmitted packet. The destination node may then transmit an acknowledgement packet to the source node. The source node may then transmit another data packet or pass the token on to the next node. If the token is passed on, the receiving node may acknowledge receipt. The invention particularly aims to provide a token bus system with improved responsiveness, data throughput and determinism.

BRIEF SUMMARY

According to the exemplary embodiment, a token bus communication network comprises a multiplicity of nodes connected by a common bus, wherein each node in operative communication with the bus is organized to transmit, when in possession of a token and having (payload) data to transmit, a 'token & data' packet which includes a payload and a header which specifies a first address identifying which node is to receive the token and a second address identifying which node is to receive the payload. Each node is preferably further organized to transmit, when in possession of the token but having no data to transmit, a 'token only' packet without a payload and including a header which specifies a first address identifying which node is to receive the token. Such a 'token only' packet preferably specifies in place of the second address an address identifying none of the nodes.

The exemplary embodiment includes a network device for use as a node in such a system and a method of operating such a system.

In a practical form of the exemplary embodiment, a node with the token can transmit on the bus a packet that contains two destination addresses in the packet. One address specifies the node that should receive the data component (payload) of the transmitted packet. The other address specifies the node that should receive the token. The network specifies that a node with the token must immediately transmit a packet containing just the token or a packet with token and data if it has data to send.

When no data is being passed from one node to another on the network, the token may be passed from one node to the next in order. Each node will pass the token to the next highest node number. If a node has the token and has some data for sending, it transmits a packet with the token for the next node and data for any of the nodes. The bus system requires all nodes to receive all packets and process them to determine whether the token or the data (or both) is destined for them.

Effectively, two messages are being sent in one time frame (packet). Preferably, to avoid contention on the bus, no acknowledgements of packet receipt are made. The system may rely on higher level protocols to check that data has been transferred correctly.

By ensuring that a node sends the token immediately, with or without data, each node should have an allotted share of the bandwidth. The worst case time between transmissions can be calculated by adding the time to transmit the maximum transmission unit (MTU) with the turn-around time and multiplying the result by the number of nodes, on the assumption that all nodes on the bus are transmitting data and that the data is of the maximum length allowed on the bus.

BRIEF DESCRIPTION OF THE DRAWINGS

FIG. 3 illustrates payload protocol identifiers.
FIG. 4 illustrates command identifiers.
FIG. 5 illustrates a response-window request.
FIG. 6 illustrates a response-window response.
FIG. 7 illustrates a sequence-table packet.
FIG. 8 illustrates a 'token-only' packet.
FIG. 9 illustrates a 'token and data' packet.

DETAILED DESCRIPTION

The following is a detailed description by way of example of a token bus system in accordance with the invention. It is intended to conform in this example to ANSI/IEEE Standard 802.4. It employs a data link protocol (Layer 2 protocol) for the transfer of packets conforming to a transmission (Layer 3) protocol which is preferably IP (Internet Protocol) between nodes on a half-duplex, multi-drop network. It is intended that the protocol should be capable of being independent of the physical media (Layer 1) and be capable of various different data rates. The protocol will, however, need to know the bit rate to establish time-out intervals.

A preferred token bus protocol provides logical bus topology and bus arbitration and provides deterministic access times for each node. It can carry IP (Internet Protocol) and ARP (Address Resolution Protocol) packets. A node may start the bus without any knowledge of other nodes. Preferably also, the system can detect a new node wishing to join the bus and continue, detect that a node has left the bus and continue, and be able to continue if the token master node leaves the bus.

Figures 1, 2:
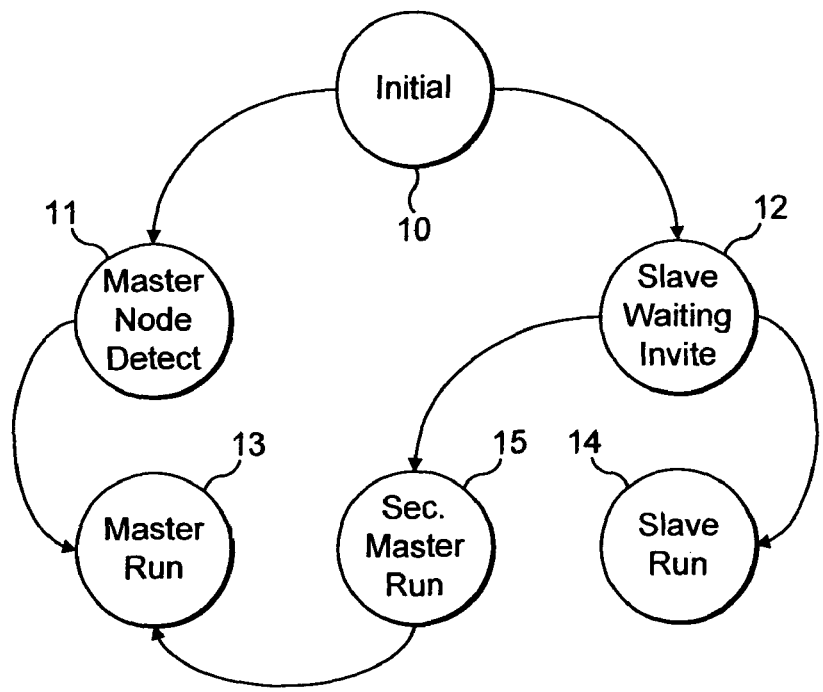
FIG. 1 illustrates a protocol state machine.
FIG. 2 illustrates schematically a packet header.

In the described system, a node may be in any one of six states, as shown in FIG. 1. The states are an Initial state 10, a Master Node Detect state 11, a Slave Waiting Invite state 12, a Master Run state 13, a Slave Run state 14, and a Secondary Master Run state 15.

FIG. 1 shows, for simplicity, only forward transitions. From any of the states shown, a node can revert to the Initial state.

Initial State

The Initial state 10 is the state which a node enters either on power-up or as a result of detecting a bus failure.

In the Initial state, the node listens for traffic on the bus for a maximum interval $i_{initial}$. The interval may for example be defined by the node's unique MAC address. Thus each node should wait a unique time. If the node detects some traffic on the line it moves to the Slave Waiting Invite state. If no traffic is detected, the node enters the Master Node Detect state.

Master Node Detect State

In the Master Node Detect state 11, a node assumes the role of 'master' of the system. It now needs to detect all the other nodes and to begin transmitting invitations immediately to block other nodes from assuming the Master Node Detect state.

The process of inviting slave nodes to join the bus needs to be robust (to catch all nodes) and quick (to allow the bus to start as quickly as possible). During the node detection process, the master will construct a Sequence Table (to be described). This table is a list of the nodes' MAC addresses with the 'master' node at the top.

A 8-bit address field allows potential 256 possible addresses. Address 0 may be reserved and address '255' may be the broadcast address.

The current master node must search for each node on the bus to construct the Sequence Table. To minimise the start-up time and to aid the subsequent detection of new nodes, a recursive search technique may be used, generally in accordance with ANSI/IEEE Standard 802.4.

The master node broadcasts a 'response-window' request packet 50 (FIG. 5) inviting all nodes with addresses in the range from 1 to 254 to respond. All nodes in the Slave Waiting Invite State 12 and in that address range must respond. If there is only one node in that range, the master node will see the response uncorrupted and add the node to the Sequence Table. If more than one node responds to the broadcast, the Master will receive a corrupted response. Two new ranges are then searched, from 1 to 127 and from 128 to 254. The master node recursively searches ever-reducing address ranges until it detects a single node in the range (identified by an uncorrupted response) or it detects no nodes in a range (identified by there being no response to the broadcast).

For example, assume that nodes with addresses 2, 4, 5, 10, 53, 126 and 254 are on the bus. Initially the node with address '2' will assume master status and move to the Master Node Detect state 11. It will then begin creating the Sequence Table by inserting its own address, 2, at the top.

The master will broadcast a response-window request for the range 1 to 254. The other nodes will move to the Slave Waiting Invite state 12 on reception of the broadcast and each will transmit to the master node a response indicating that it is present. A simultaneous transmission by the nodes will be received by the master node as a corrupt packet. The master determines that there is more than one node on the bus in that range and divides the initial range into two sub-ranges, i.e. 1 to 127 and 128 to 254. It will broadcast a response-window-request packet (FIG. 5) on each of these ranges in turn. If it receives a valid response packet (FIG. 6) from a single node it adds the node to the Sequence Table and sub-divides the search range no further. If it receives no response after $t_{no\_response}$, it assumes there are no nodes in that range and sub-divides no further. If it receives a corrupted response it will sub-divide the search range further until all nodes are located.

TABLE 1

| Operation | Result |
| --- | --- |
| Trying Range 1 to 254 | Bad |
| Trying Range 1 to 127 | Bad |
| Trying Range 1 to 64 | Bad |
| Trying Range 1 to 16 | Bad |
| Trying Range 1 to 8 | Bad |
| Trying Range 1 to 4 | Found '5' |
| Trying Range 5 to 8 | Found '10' |
| Trying Range 9 to 16 | Found '10' |
| Trying Range 17 to 32 | Nothing |
| Trying Range 33 to 64 | Found '53' |
| Trying Range 64 to 127 | Found '126' |
| Trying Range 128 to 254 | Found '254' |

Table 1 above shows a simulation of the master node searching for the other nodes. It shows the ranges broadcast followed by what sort of response it received. The term "Bad" means that more than one node responded; the term "Found" means a single node response was received; the term "Nothing" means no response was received.

The search shown by way of example has found nodes numbered 4, 5, 10, 53, 126 and 254; six nodes have been found in 13 broadcasts.

An exemplary algorithm for this purpose, expressed in 'C', is shown, with annotations, in Table 2. The search function is called externally with the range 1 to 254.

TABLE 2

```
void Search (int Min, int Max)
{
    int result = BroadCastSearch ( Min, Max ) ;      // search range
    int newMin ;
    int newMax ;
    if (( result != NOTHING ) && ( result != BAD ))  // If unique node
                                                      found
    {
        cout << " Found " setw(3) << setfill (' ') << result endl ;
        SeqAddNode ( result ) ;                      // Add it
    }
    else if ( result = = BAD )                       // if multiple
                                                      nodes
    {
        cout << " Bad" << endl ;
        -------------------------------
        newMax = ( Min + (( Max – Min ) / 2 ) ;
        Search ( newMin, Max) ) ;                    // search the low
        -------------------------------                 half
        newMax = ( Min – (( Max – Min ) / 2 ) ;
        Search ( newMin, Max) ) ;                    // search the high
    }                                                   half
    else cout << " Nothing " << endl ;
}
```

The function BroadCastSearch( ) is expected to create the broadcast packet, to transmit it on the bus and to wait for response or timeout. It returns either the node number it found, 'nothing' defined as a unique number outside the valid address range or 'bad', again defined as a unique number outside the valid address range.

Having detected each node on the bus and added them all to the Sequence Table, the master broadcasts a packet 70 (FIG. 7) containing the Sequence Table to all nodes. The master then assumes possession of the token and moves to the Master Run state.

If no node responds to the initial response-window request, the master will revert to the Initial state.

It may be possible that more than one node could respond to the response-window request packet from the master and that the timing of those responses meant that they were received without error. If the packets are received correctly, the master can add all those nodes to the Sequence Table and stop dividing in the address range. If any of the packets are received corrupted, the master must sub-divide the address range.

Multiple Masters on the Bus

It is possible that more than one node could enter the Master Node Detect State, because nodes are started out of synchronism and each determines that it should be 'master' at the same moment. The bus must recover from this contentious state.

When more than one node transmits a response-window request packet, there may be a mix of successful and unsuccessful packets. This will result in either:

(a) no master having a node on its Sequence Table;
(b) one master having nodes on its Sequence Table; or
(c) multiple masters having some nodes on their Sequence Tables If no master has a node in its Sequence Table, each master will return to the Initial state. This will cause a re-synchronisation of nodes such that subsequent re-start should be successful.

If only one master has a node or nodes on its Sequence Table, there is partial success in starting the bus. Those masters with no nodes in their Sequence Tables will revert to the Initial state and may join the bus later as slaves during a new node detection phase.

If more than one master has a node on its Sequence table, each master will broadcast its Sequence Table and attempt to begin token passing. Many bus collisions will occur such that no slaves receive the Sequence Table correctly or if some do they will receive corrupted tokens. In either event the master will being removing slaves from the Sequence Table using Node Loss Detection and eventually will have no nodes in its Sequence Table. This will cause it to revert to the Initial state. Either all the masters will revert to the Initial state or, possibly, one may succeed as master.

Slave Waiting Invite State

In the Slave Waiting Invite state 12, a node will listen for an invitation to join the bus. It will expect to receive response-window request broadcasts and Sequence Table broadcasts 70.

If a response-window request 50 is received, the node will look at the address range. If its MAC address is within the range it will respond by sending a Response-Window Response 60 (FIG. 6) to the master.

If a Sequence Table is received, the node will determine where it is located in the Table and the address of the node below it in the table. This is the address to which this node will always pass the token. The table is cyclic; if the node is at the bottom of the table, the node will pass the token to the address at the top of the table (the Master). If the node is the second node in the table, the node moves to the Secondary Master Run state. Otherwise the node moves to the Slave Run state 14.

If the node detects silence on the bus for more $t_{silence\_slave}$ then it will revert to the Initial State.

Slave Run State

In the Slave Run state 14, the node will respond only to the Token Only, Token & Data and Sequence Table commands in FIG. 4.

The node detects if there has been silence on the bus for more than $t_{silence\_slave}$. If this be so, the node will revert to the Initial state 10.

The node detect if it does not receive the token for more than $count_{fail}$ loops of the token around the bus. If this be so, the node will revert to the Initial state.

If the node receives a response-window request while it is in this state 14, it ignores that request. It may be assumed that such a request occurs because the master is performing New Node Detection.

If the node receives a Token Only packet, it must transmit either a Token Only packet or a Token & Data packet (if it has data to transmit) immediately.

If the node receives a Sequence Table it will overwrite its current Sequence Table and again determine its location to establish the node address whence to pass the token and whether its address is the second in the table. If its address is second in the table the node moves to the Secondary Master Run state. If the node finds that it is not in the Sequence Table, the node will revert to the Initial state.

Master Run State

In the Master Run state 13, if the node has possession of the token it immediately passes on the token to the node below it in the Sequence Table either by transmitting a Token Only packet, if it has no data to send, or a Data and Token packet if it has data to send. Additionally, the master performs Node Loss Detection and New Node Detection functions as described below.

Node Loss Detection

The master node also listens to all other bus traffic to detect the loss of the token either by token corruption or by a node leaving the bus. The master stores the last Token Destination that was transmitted on the bus. It must also listen for silence on the bus for great than $t_{silence}$.

If the bus is silent for more than $t_{silence}$, the master should assume that the node that was supposed to receive the token in the last packet did not receive it correctly. The master increments a 'token dropped' counter associated with that node. The master will look-up the Sequence Table and send a Token Only packet to the node next in the Table after the node that failed to respond, to restart the bus.

If the Master detects that it has counted $count_{fail}$ 'token drops' in a row for a specific node it determines that the node has left the bus. It updates the Sequence Table, removing that node from the Table and broadcasts the new table to all nodes. It assumes possession of the token and re-starts the bus by passing it on.

New Node Detection

In the Master Run state, a node also performs New Node Detection. This is done every $t_{detect}$ and can only be done when the master holds the token. This is achieved by broadcasting a response-window request 50 (as done in the Master Node Detect state) over the full range of valid addresses. Nodes which are in the Slave Run state will not respond to this request, but a new node in the Slave Waiting Invite state will respond.

As before, if a single node responds, the node is added to the Sequence Table and the master updates the Sequence Table and broadcasts it to all nodes. The new node thus joins the bus. The master has possession of the token and re-starts the bus by passing it on.

If no new nodes wishes to join the bus, the master will detect no response after $t_{no\_response}$. The master has possession of the token and re-starts the bus by passing it on.

If multiple nodes wish to join the bus, the master will receive a corrupted response due to multiple nodes transmitting simultaneously. The master performs its search algorithm to locate each new node. The bus is put in abeyance during this process. The master adds each new node to the Sequence Table and broadcasts the updated table to all nodes after all new nodes have been detected. The new nodes thus join the bus. The master has possession of the token and re-starts the bus by passing it on.

Secondary Master Run State

The Secondary Master Run state 15 shown in FIG. 1 is not entirely necessary. It may be provided to allow the master node to leave or fail without disabling the entire bus. In the absence of state 15, when the master leaves the bus, all nodes in the Slave Run state would revert to the Initial state and the bus would re-start. This may take some time due to the backoff of each node when determining the new master. Additionally, the master may have simply received a corrupted packet in which it should have found the token. However, to require the network to re-start because of a simple bit error would normally be unsatisfactory.

In the Secondary Master Run state the node listens to all bus traffic to detect when the token is passed to the master node (the address at the top of the Sequence Table). If the last packet contained the Token Destination set to the Masters MAC address and then $t_{silence}$ time passes, the Secondary Master should assume possession of the token (it is the next node in the Sequence Table) and increment a counter to count the number of no responses in a row by the master. The node can transmit a 'Token only' packet 80 or a 'Token & Data' packet 90 to allow the bus to continue.

If the node detects that the master has not responded count-$t_{fail}$ times in a row, it assumes the master has left the bus. It will update its Sequence Table, putting itself at the top and removing the master completely. It broadcasts the new Sequence Table to all other nodes in the bus. The node then moves to the Master Run state.

Timeout Times and Counters

The preferred protocol identifies the following time periods:

(i) $t_{initial}$=MAC address*(m*1 bit time*10)
(ii) $t_{detect}$=$t_1$ seconds
(iii) $t_{silence}$=n+(2*MTU*1 bit time*10),
(iv) $t_{silence\_slave}$=j+(2*MTU*1 bit time*10), tsilence_slave>tsilence).
(v) $t_{no\_response}$=(k*1 bit time*10).

The protocol identifies the following counter: count$_{fail}$=3.

Possible values for the 'constants' mentioned above are m=$t_{no\_response}$, $t_1$=30 seconds, j=such that $t_{silence\_slave}$, k=80. The exact values of the constants m, n, j and k are selectable but they must take into account that the escape character encoding (see below) can increase the MTU by a factor of 2.

Packet Encoding

Before transmission on a medium, all packets are normally encoded with HDLC style escape characters to allow a unique frame start byte to be used. The token bus protocol may use a simplified version of this technique. This form of encoding provides a unique byte for the start of a frame.

The token bus start frame sync byte is 0x5A. All packets will therefore have a first byte of 0x5A and this byte will not appear anyway else in the transmission media. If the byte 0x5A happens to be in the packet, it is converted to the two byte sequence 0xA5, 0x7A. To achieve this, the escape character 0xA5 is inserted and bit 5 of 0x5A is toggled to give the byte 0x7A. If the byte 0xA5 is in the packet it is encoded as the bytes 0xA5, 0x85 (again, bit 5 is toggled in the second byte).

For decoding, the byte 0x5A will always identify a start of frame. If the byte 0xA5 is detected, it is dropped and the subsequent byte has its bit 5 toggled to recreate the original byte required. So if the two-byte sequence 0xA5, 0x7A is read, it would be decoded as the single byte 0x5A. If the two-byte sequence 0xA5, 0x85 is read, it would be decoded to the single byte 0xA5. All other bytes in a packet are transmitted as found.

As an example, if the fourteen byte sequence
5A:12:34:56:A5:78:90:A5:96:97:98:5A:5B:55:
is to be transmitted, it is encoded as the seventeen byte sequence:
5A:12:34:56:A5:85:78:90:A5:85:96:97:A5:7A:5B:55:
before transmission. The receiver will receive the above and decode it back to the fourteen byte sequence:
5A:12:34:56:A5:78:90:A5:96:97:98:5A:5B:55:

Table 3 below is an example of an algorithm for encoding a packet before transmission.

TABLE 3

```
Typedef struct
{
    int size
    unsigned char data (2*MTU) ;
} t_Packet ;
------------------------
// This takes a raw packet and creates an encoded packet.
// Two separate buffers must be passed, if you pass the
// same packet pointer failure will occur.
// Returns size of encoded packet.
Int EncodePacket ( t_Packet* raw, t_Packet* encoded )
{
    encoded->size = 0;
    for ( int i=0; i<rw->size; i++ )
    (
        if (
            (( raw->data[i] == 0x5A ) && ( I !=0 ))// If got 0x5A mid
            packet
            ||                                    // or
            ( raw->data[i] == 0xA5 )              // got an 0xA5
        )
        (
            encoded->data(encoded->size) = 0XA5 ;    // Insert esc char
            encoded->size++;
        encoded-?data(encoded->size) = raw->data[i] ^ 0x20 ; // Encode
        byte.
        )
        else
        (
            encoded->data(encoded->size) = raw->data[i] ;
        )
        encoded->size++;
    )
    return encoded->size ;
}
```

Table 4 below is an example of an algorithm for decoding a packet on reception.

TABLE 4

```
// This takes an encoded packet and regenerates a raw packet.
// The encoded and raw buffers should be separate.
// Returns the size of the regenerated raw packet.
Int DecodePacket ( t_Packet* encoded, t_Packet* raw )
{
    raw->size = 0;
    for ( int i=0; i<encoded-> size; i++ )
    (
        if ( encoded->data[i] == 0xA5 )    // Found escape char
        (
            i++;                           // jump to next byte
                                           // decode the byte and copy to
raw
            raw->data[raw->size] = encoded->data[i] ^ 0x20;
        )
        else
        (
            raw->data[raw->size] = encoded->data[i] ; // Otherwise just
            copy.
        )
        raw->size++;
    )
    return raw->size ;
}
```

Building a Packet

A packet is built preferably in the following order:

1. Add the payload (e.g. IP packet) to the header, set in the header (FIG. 2) the data length parameter (bytes 8 & 9), address parameters (bytes bytes 2, 3 and 4), command number (byte 1) and protocol type parameter (byte 5).

2. Set the checksum parameter to zero, calculate the checksum of the header only and set the checksum (FIG. 2, bytes 6 & 7) to this value.
3. Perform the escape character encoding of the entire packet to ensure that there is only one instance of the synch byte in the packet.
4. Transmit the packet on the line.

TCP/IP Header Compression

The token bus protocol may be adapted to, for example, Van Jacobson TCP/IP header compression. The token bus can be extended to cater for this compression by extending the 'protocol field' codes to indicate if the payload contains compressed TCP/IP headers. This will allow non-compressed and compressed packets to co-exist on the same network.

Although the header contains fields that are not always required (e.g. Protocol, Data Length, Data Destination in a Token Only packet), they are always present. This allows the receiver to create a checksum of the header without needing to know the command field value (which may be corrupted). Only if the checksum is correct will the command field value be assumed to be valid. The Data field may be zero bytes in length.

Protocol Identification

The Protocol field (byte 5) of the token bus packet header 20 (FIG. 2) identifies the protocol type (if any) employed in the data payload. The table 30 (FIG. 3) indicates examples of the respective byte' values which may be used; 0x00 indicates 'no protocol', 0x01 indicates 'ARP' and 0x02 indicates 'IP'.

Commands

The Command field (byte 1) of the token bus header 20 identifies the packet type. The various commands and their identification are shown in the table 40 (FIG. 4).

Response-Window Request

A response-window request packet is used, by the master node only, to detect the presence of the other nodes connected to the bus. An example is shown by the packet 50 in FIG. 5.

The Source field is the MAC address of the Master node transmitting the packet. The Token Destination is also the Master MAC address to show that it maintains possession of the token.

The 'Data Length' field in a response-window request packet to provide an address range field. The master expects all nodes in the address range Min Address to Max Address, inclusive, to reply with a response-window response packet.

Response-Window Response

A response-window response packet 60, shown for example in FIG. 6, is only transmitted by a slave node in the Slave Waiting Invite state after that node has received a Response-Window Request 50 with its MAC address in the range. The response packet 60 used by the slave node to indicate that it wishes to join the bus.

For a response-window response packet, the node sets the Source field to its own address and the Data and Token Destination fields to that of the master that transmitted the Request.

The Data Length field is divided in to two Source Check address fields. They are both set to the slave MAC address.

The Master checks that:
(1) Source=Source Check 1=Source Check 2
(2) Data Dest=Token Dest This is intended to help locate unique node addresses when a bus contention may have occurred.

Sequence Table

An exemplary Sequence Table packet 70 as shown by way of example in FIG. 7 is broadcast by the master to indicate to all nodes whence to pass the token. On receiving a Sequence Table packet, a node must delete its current Sequence Table and overwrite it with the one received.

The Sequence Table data consists of a list of bytes, each the address of a node. The table is preceded by an additional checksum field that covers just itself and the Sequence Table data. The checksum is calculated using the same method as for the header algorithm.

If the Sequence Table is received corrupted, a slave node is unable to establish that a new Sequence Table has been transmitted. If the slave node has been removed from the bus, it will never receive the token and the slave node will eventually move back to the Initial state 10. If the node is still on the bus then it will receive the token but may not pass it to the correct node. This could result in a one or more nodes being left off the bus, which will eventually fall back to the Initial state due to the lack of the token. However, if the node being missed is the master, then control has been lost. The secondary master will detect the missing master and take over as master. In doing so, it broadcasts a new Sequence Table. This should reassert control and re-start the bus. The previous master will revert to the Initial state and rejoin the bus later.

In the worst case of inconsistent Sequence Tables, a node could pass on the token and miss both the master and the secondary master. Neither of these could now take charge of the bus and may leave the bus running, but out of control. Eventually, the nodes in the Slave Run state would detect that there have been no New Node Detect attempts from the master and would therefore revert to the Initial State.

Token Only Packet

An exemplary 'Token Only' packet 80 is shown in FIG. 8. It is used to pass the token to the next node in the Sequence Table. There is no transmitted response to this command. A node will transmit this packet if it has received (or taken possession of) the Token but has no payload data to transmit. A node having received the Token via a 'Token Only' or a 'Token & Data' packet must pass it on immediately in the same manner. The only exception to this is when the Master node, having received the token, determines that it is time to perform New Node Detection.

Token & Data

Figure 10:
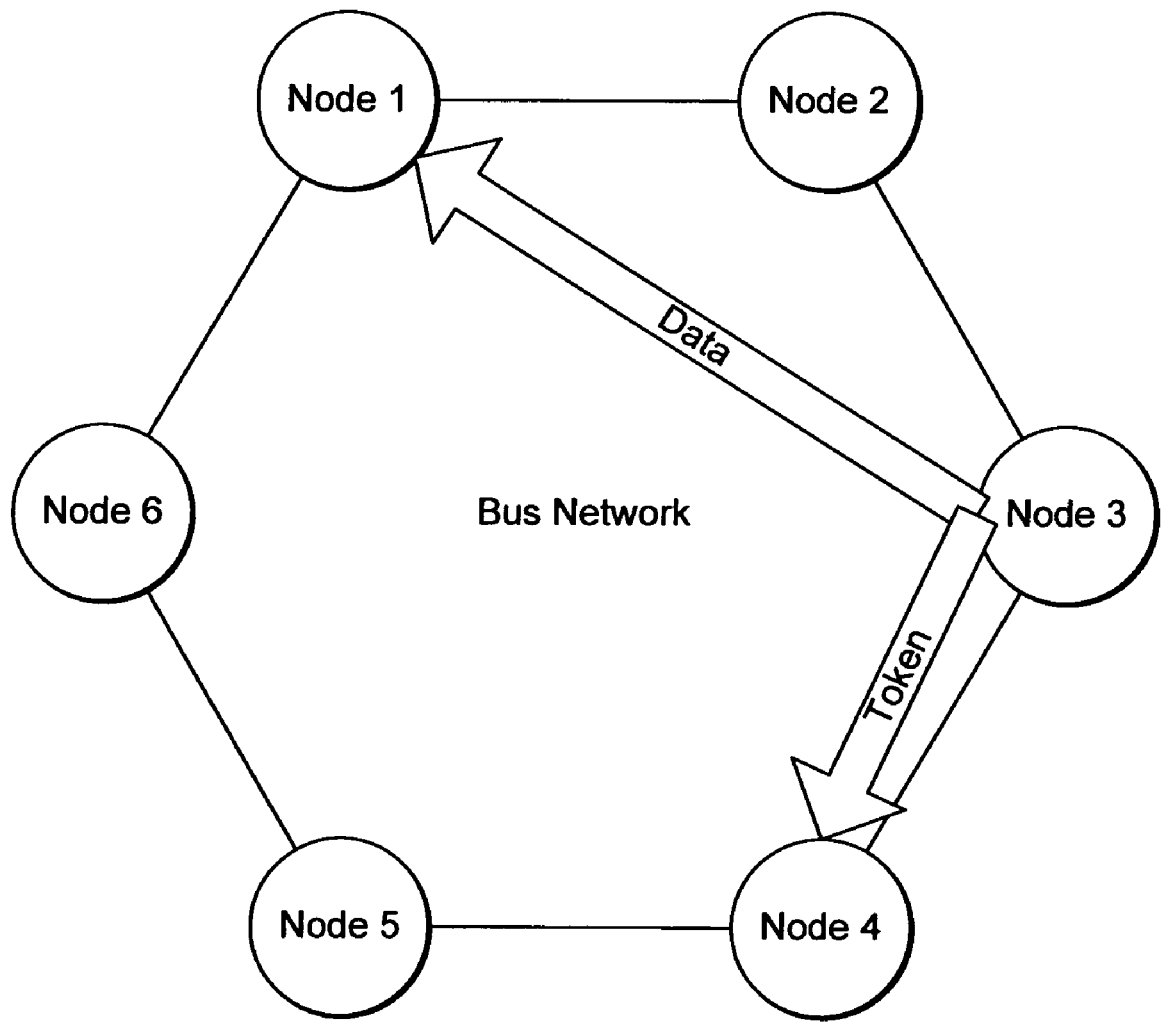
FIG. 10 illustrates the token bus system in operation.

A 'Token & Data' packet 90 as shown by way of example in FIG. 9 is used to send data from one node to another. In doing so the node must also pass on the token. The token can be addressed to a different node than the one to which the data is sent, as schematically shown in FIG. 10. This is achieved by the provision of separate Token Destination and Data Destination fields. Because the network is a bus, all nodes will receive the packet.

The node with the Token Destination address will assume possession of the token. The node with the Data Destination address will take the data and pass it up to its higher protocol handler. All other nodes will discard the packet. The Token Destination and Data Destination field values may be the same, coincidentally. There is no transmitted response to this command. There is no checksum on the data payload; it is assumed that the payload contains its own error checking.

In FIG. 9, the bytes 10, 11 et seq. indicate the payload data. The packet may be an ARP or IP packet.

Checksum Calculation

The Checksum field for all token bus packets uses the IP checksum. This is not necessarily the most effective checksum, but it is quick to calculate. The code shown in Table 5 below may be used to build the checksum.

To set the checksum in a packet, the Checksum field must be first set to 0x0000. The resulting checksum on the entire packet header is then loaded into the Checksum field.

Table 5 below shows an algorithm for computation of the Checksum.

TABLE 5

```
uint16 IP_Checksum( uint8* Data, uint16 Length )
{
    uint32   checksum = 0L;
    uint16   n;
    uint16*  p;
    uint16   carries;
    n = Length >> 1 ;          // divide by 2
    p = (uint16*)Data;
    while ( n - - )
        checksum += *p++ ;
    if ( Length & 1 )
        checksum += Swap ( ((uint8)p) );
        checksum += * ((uint8*)p) ;
    while (( carries=(uint16) (checksum>>16)) != 0 )
        checksum = ( checksum & 0xffffL ) + carries;
    return (uint16) (~checksum) ;
}
```

The bandwidth of a link using the token bus protocol is dependent on the bit rate and the number of nodes on the bus. Potentially, the bit rate could be quite slow and the number of nodes quite large.

In a practical example, the bus will be used at 60 Kbps with up to 6 nodes. This would effectively give 10 Kbps per node assuming all nodes are transmitting packets of MTU size. If the MTU is 1500 bytes, at 10 Kbps it would take 1.5 seconds to transmit a packet of this size, which would be too long a time delay in the network. If the MTU were 256 bytes the time for transmission would be reduced to 256 ms, which is more acceptable.

It is unlikely that all nodes on a bus would be transmitting MTU sized packets all at once. Therefore a reduction to a MTU of 256 bytes and would likely cause much fragmentation at routers. This could be particularly inefficient if protocols such as Modbus TCP/IP are being used.

The MTU of the protocol should be configurable by the system to allow performance to be optimised. The largest MTU should be at least the same as for Ethernet, i.e. 1500 bytes.

The invention claimed is:

1. A token bus communication system comprising a multiplicity of nodes connected by a common bus, wherein each of the multiplicity of nodes is organized:
   (i) when in possession of a token and having data to transmit, to transmit a 'token and data' packet including a payload and having a header including a first address field identifying which node is to receive the token and a second address field identifying which node is to receive the payload;
   (ii) when in possession of a token and having no data to transmit, to transmit a 'token only' packet having said first and second address fields, wherein said first address field identifies which node is to receive the token and said second address field identifies none of said nodes; and
   (iii) to receive from other nodes 'token & data' and 'token only' packets and to determine whether a token and/or data is destined for that node;
   and wherein:
   (a) each of the nodes in the multiplicity thereof is operative to have a master state in which it determines the identity of all of the other nodes in operative connection with the common bus and broadcasts to all the other nodes a sequence table which specifies an order for the reception of the token; and
   (b) each of the nodes in the multiplicity thereof is operative to have at least one run state in which, in response to reception of the token, it transmits the token immediately to the node next following it in the sequence table.

2. The token bus communication system of claim 1, wherein each of the nodes in the multiplicity thereof is organized on entry into a master state to perform a search to determine the identities of all the other nodes in operative connection with the bus.

3. The token bus communication system of claim 2, wherein said search is a recursive search wherein ever-reducing ranges of addresses are searched until for each range not more than one node is detected.

4. The token bus communication system of claim 3, wherein each of the nodes in the multiplicity thereof is operative in a master state to determine from silence on the bus for more than a predetermined time that a node failed to respond to the transmission of the token and thereupon to send a 'token only' packet to the node next in the sequence table after he node that failed to respond.

5. A token bus communication system comprising a multiplicity of nodes connected by a common bus, wherein each of the multiplicity of nodes is organized:)
   (i) when in possession of a token and having data to transmit, to transmit a 'token & data' packet including a payload and having a header including a first address field for identifying which node is to receive the token and a second address field for identifying which node is to receive the payload;
   (ii) when in possession of a token and having no data to transmit, to transmit a 'token only' packet having said first and second address fields, wherein said first address field identifies which node is to receive the token and said second address field identifies none of the said nodes; and
   (iii) to receive from other nodes 'token & data' and 'token only' packets and to determine whether a token and/or data is destined for that node;
   wherein all said packets have a common frame structure including a command field which has a first value for a 'token & data' packet and a second value for a 'token only' packet;
   and wherein:
   (a) each of the nodes in the multiplicity thereof is operative to have a master state in which it determines the identity of all of the other nodes in operative connection with the common bus and broadcasts to all the other nodes a sequence table which specifies an order for the reception of the token; and
   (b) each of the nodes in the multiplicity thereof is operative to have at least one run state in which, in response to reception of the token, it transmits the token immediately to the node next following it in the sequence table.

6. The token bus communication system of claim 5, wherein each of the nodes in the multiplicity thereof is organized on entry into its master state to perform a search to determine the identities of all the other nodes in operative connection with the bus.

7. The token bus communication system of claim 6, wherein said search is a recursive search wherein ever-reducing ranges of addresses are searched until for each range not more than one node is detected.

8. The token bus communication system of claim 7, wherein each of the nodes in the multiplicity thereof is operative in a master state to determine from silence on the bus for more than a predetermined time that a node has failed to respond to the transmission of the token and thereupon to send a 'token only' packet to the node next in the sequence table after the node that failed to respond.

9. A token bus communication system comprising a multiplicity of nodes connected by a common bus, wherein each of the multiplicity of nodes is organized:
  (i) when in possession of a token and having data to transmit, to transmit a 'token & data' packet including a payload and having a header including a first destination address field for identifying which node is to receive the token, a second destination address field for identifying which node is to receive the token and a command field identifying this packet as a 'token & data' packet;
  (ii) when in possession of a token and having no data to transmit, to transmit a 'token only' packet having a header including a destination address field identifying which node is to receive the token and a command field identifying this packet as a 'token only' packet; and
  (iii) to receive from other nodes 'token & data' and 'token only' packets and to determine whether a token and/or data is destined for that node;
  and wherein:
  (a) each of the nodes in the multiplicity thereof is operative to have a master state in which it determines the identity of all of the other nodes in operative connection with the common bus and broadcasts to all said other nodes a sequence table which specifies an order for the reception of the token; and
  (b) each of the nodes in the multiplicity thereof is operative to have at least one run state in which, in response to reception of the token, it transmits the token immediately to the node next following it in the sequence table.

10. The token bus communication system of claim 9, wherein each of the nodes in the multiplicity thereof is organized on entry into its master state to perform a search to determine the identities of all the other nodes in operative connection with the bus.

11. The token bus communication system of claim 10, wherein said search is a recursive search wherein ever-reducing ranges of addresses are searched until for each range not more than one node is detected.

12. The token bus communication system of claim 9, wherein each of the nodes in the multiplicity thereof is operative in a master state to determine from silence on the bus for more than a predetermined time that a node has failed to respond to the transmission of the token and thereupon to send a 'token only' packet to the node next in the sequence table after the node that failed to respond.

* * * * *